United States Patent
Olivier

(10) Patent No.: US 7,092,315 B2
(45) Date of Patent: Aug. 15, 2006

(54) DEVICE FOR LATERALLY STEERING STREAMER CABLES

(75) Inventor: Andre' W. Olivier, River Ridge, LA (US)

(73) Assignee: Input/Output, Inc., Stafford, TX (US)

(*) Notice: Subject to any disclaimer, the term of this patent is extended or adjusted under 35 U.S.C. 154(b) by 4 days.

(21) Appl. No.: 10/709,772

(22) Filed: May 27, 2004

(65) Prior Publication Data

US 2005/0276161 A1  Dec. 15, 2005

(51) Int. Cl.
*G01V 1/38* (2006.01)
*B63H 25/00* (2006.01)

(52) U.S. Cl. ......................... 367/17; 114/246
(58) Field of Classification Search .......... 367/17; 114/246
See application file for complete search history.

(56) References Cited

U.S. PATENT DOCUMENTS

| | | | |
|---|---|---|---|
| 3,434,446 A | 3/1969 | Cole | 114/235 |
| 3,605,674 A | 9/1971 | Weese | 114/235 B |
| 3,774,570 A | 11/1973 | Pearson | 114/235 B |
| 3,931,608 A | 1/1976 | Cole | 340/7 PC |
| 3,961,303 A | 6/1976 | Paitson | 340/7 PC |
| 4,033,278 A | 7/1977 | Waters | 114/245 |
| 4,463,701 A | 8/1984 | Pickett et al. | 114/245 |
| 4,711,194 A | 12/1987 | Fowler | 114/245 |
| 4,729,333 A | 3/1988 | Kirby et al. | 114/244 |
| 4,890,568 A | 1/1990 | Dolengowski | 114/246 |
| 5,443,027 A | 8/1995 | Owsley et al. | 114/244 |
| 5,529,011 A * | 6/1996 | Williams, Jr. | 114/245 |
| 5,532,975 A | 7/1996 | Elholm | 367/16 |
| 6,011,752 A | 1/2000 | Ambs et al. | 367/17 |
| 6,016,286 A * | 1/2000 | Olivier et al. | 367/17 |
| 6,091,670 A | 7/2000 | Olivier et al. | 367/76 |
| 6,144,342 A | 11/2000 | Bertheas et al. | 343/709 |
| 6,234,102 B1 | 5/2001 | Russell et al. | 114/244 |
| 6,459,653 B1 | 10/2002 | Kuche | 367/17 |
| 6,525,992 B1 | 2/2003 | Olivier et al. | 367/17 |
| 6,671,223 B1 | 12/2003 | Bittleston | 367/19 |
| 2003/0039170 A1 | 2/2003 | Soreau et al. | 367/17 |

* cited by examiner

*Primary Examiner*—Ian J. Lobo
(74) *Attorney, Agent, or Firm*—James T. Cronvich

(57) ABSTRACT

A device and a method for laterally steering a streamer cable towed underwater behind a seismic survey vessel. The device includes a cable-steering assembly rotatably attached to a streamer cable. The assembly includes a body to which one or more wings are mounted. The wings are arranged to pivot about pivot axes. The assembly is ballasted so that the pivot axes of the wings are largely in a vertical plane. A conventional cable-leveling bird is converted to one version of a cable-steering device by ballasting to maintain the pivot axes of the bird's wings largely vertical. With an orientation sensor for sensing the orientation of the wings, the cable-steering device adjusts the angle of the wings to provide a sideward component of force to steer the streamer.

50 Claims, 9 Drawing Sheets

DEVICE FOR LATERALLY STEERING STREAMER CABLES

BACKGROUND OF INVENTION

The invention relates generally to marine seismic prospecting and, more specifically, to devices and methods for controlling the lateral position of streamer cables towed underwater behind survey vessels.

In marine seismic exploration, instrumented cables, known as streamers, are towed underwater by a survey vessel. The streamers are outfitted with a variety of electronic devices, including hydrophones that detect seismic signals transmitted into the water and reflected off geologic structures beneath the sea floor.

Devices known as cable-leveling birds are attached to a streamer at intervals along its length to control the streamer's depth. The birds are equipped with adjustable diving planes, generally referred to as wings, each having a pitch axis about which the wings can be pivoted by a motor to generate the lift needed to maintain the cable at a desired depth. Most commonly, the birds are rotatably attached to the streamer and weighted to hang pendulously from the cable with the pitch axis of the wings below the cable. These birds are effective depth-control devices.

It is not uncommon for a survey vessel to tow six or eight or more streamers of lengths up to 12 km. Because the costs of lost survey time and of replacing a damaged or lost streamer are so high, it is important that the streamers not become entangled during their deployment. Entanglement is more likely to occur in the presence of strong cross currents or while the survey vessel is turning to make another pass across the survey zone. To help avoid entanglement in turns, for example, each streamer is often operated at a different depth. While this technique provides some measure of entanglement control, it also subjects the cables to potentially strong shear layers of current that vary considerably with depth, possibly increasing the risk of entanglement. Generally the most satisfactory way to avoid entanglement with conventional systems is to steer the vessel through wide turns and to overspace the streamers from each other. But these techniques increase cost and reduce the precision of the seismic image.

Paravanes and other devices are used to separate the streamers at their head ends close to the survey vessel. But lateral streamer control and streamer position predictability diminish as cable tension lessens down the lengths of streamers. The wake created by the seismic vessel creates a phenomenon known as "trouser" effect on the array. The streamers fan out port and starboard, creating a large void in the seismic coverage directly aft of the vessel. The streamers assume the shape of trousers. These voids must be resurveyed on subsequent passes known as "in-fill." In-fill can increase the cost of seismic surveying by up to 20%. Lack of repeatability in processes and positional inaccuracies can reduce the quality of the seismic data and increase the cost by necessitating in-fill. Thus, there is a need to provide a technique for lateral streamer positioning to reduce the cost of operation and to improve the quality of the resultant seismic image.

Today's state-of-the-art seismic vessels have the capacity to deploy, tow, and recover up to 18 streamers. Existing deployment schemes limit the degree to which streamers can be simultaneously deployed, which greatly increases the cost of operation. There is a need to provide for lateral streamer control during the deployment and recovery phases to support simultaneous streamer operation without entanglement.

SUMMARY OF INVENTION

Accordingly, a method embodying features of the invention is provided for laterally steering a streamer. A bird assembly of the kind typically operated in a depth-controlling orientation in which one or more wings are pivotable about one or more pivot axes that lie generally in a horizontal plane is operated in another way. The bird assembly is operated in an orientation in which the one or more pivot axes of the one or more wings lie largely in a vertical plane to steer the streamer laterally.

In another aspect of the invention, a method for converting a cable-leveling bird into a cable-steering bird comprises ballasting the bird so that it operates underwater in an orientation in which each of a pair of wings of the bird pivots about a pivot axis that lies largely in a vertical plane to steer the attached underwater cable laterally.

In yet another aspect of the invention, an underwater cable-steering device comprises a connector attachable around the periphery of an underwater cable section and rotatable about the cable. A control device includes a body connected to the connector external of the cable. The control device includes a first wing at one side of the body and a second wing at an opposite side of the body. The first wing pivots about a first axis, and the second wing pivots about a second axis. The two axes may coincide, but do not intersect the cable. The control device also includes means for pivoting the wings about their pivot axes. Ballast means is provided to help ballast the steering device to maintain the pivot axes largely vertical.

In another aspect of the invention, an underwater cable-steering device comprises a connector attachable around the periphery of an underwater cable section and rotatable about the cable. A control device includes a body connected to the connector external of the cable. The control device includes a shaft extending through the body and defining a pivot axis. A first wing portion is connected to one end of the shaft at one side of the body, and a second wing portion is connected to the other end of the shaft at an opposite side of the body. The two wing portions may be unitarily formed as a single wing. The pivot axis does not intersect the cable. Ballast means is provided to help ballast the steering device to maintain the pivot axis largely vertical.

In still another aspect of the invention, an underwater cable-steering device comprises a connector attachable around the periphery of an underwater cable section and rotatable about the cable. A control device includes a body connected to the connector external of the cable. A first shaft extends from a first side of the body. A first wing attached at an end of the first shaft can pivot about a first axis defined by the axial rotation of the first shaft. The first axis does not intersect the cable. The control device also includes means for pivoting the wings about their pivot axes. Ballast means is provided to help ballast the steering device to maintain the first axis largely vertical.

BRIEF DESCRIPTION OF DRAWINGS

These features and aspects of the invention, as well as its advantages, are better understood by reference to the following description, appended claims, and accompanying drawings, in which:

DETAILED DESCRIPTION

Figure 1:
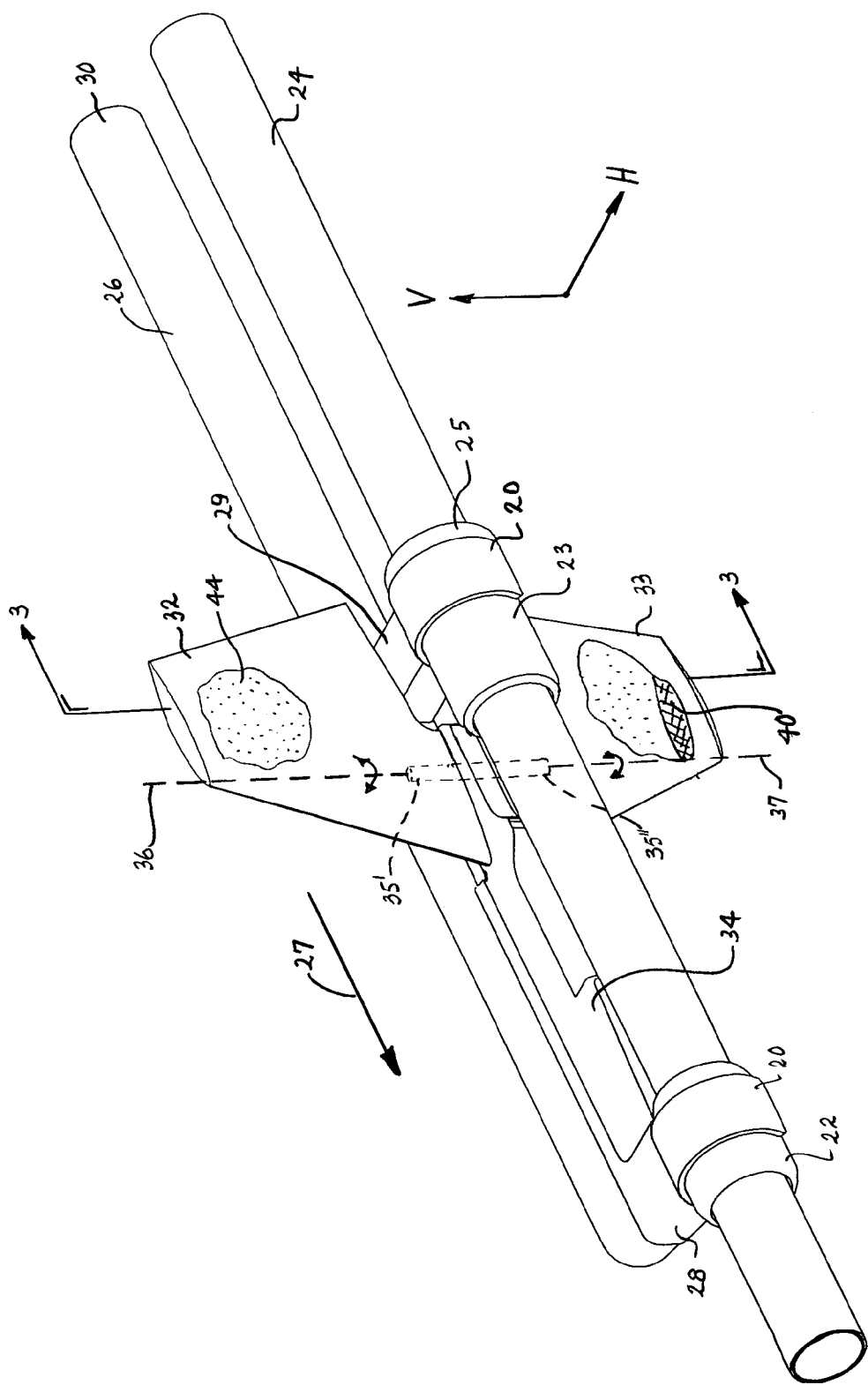
FIG. 1 is an isometric view, partly cutaway, of a cable-steering device embodying features of the invention on a section of streamer cable.
Figure 2:
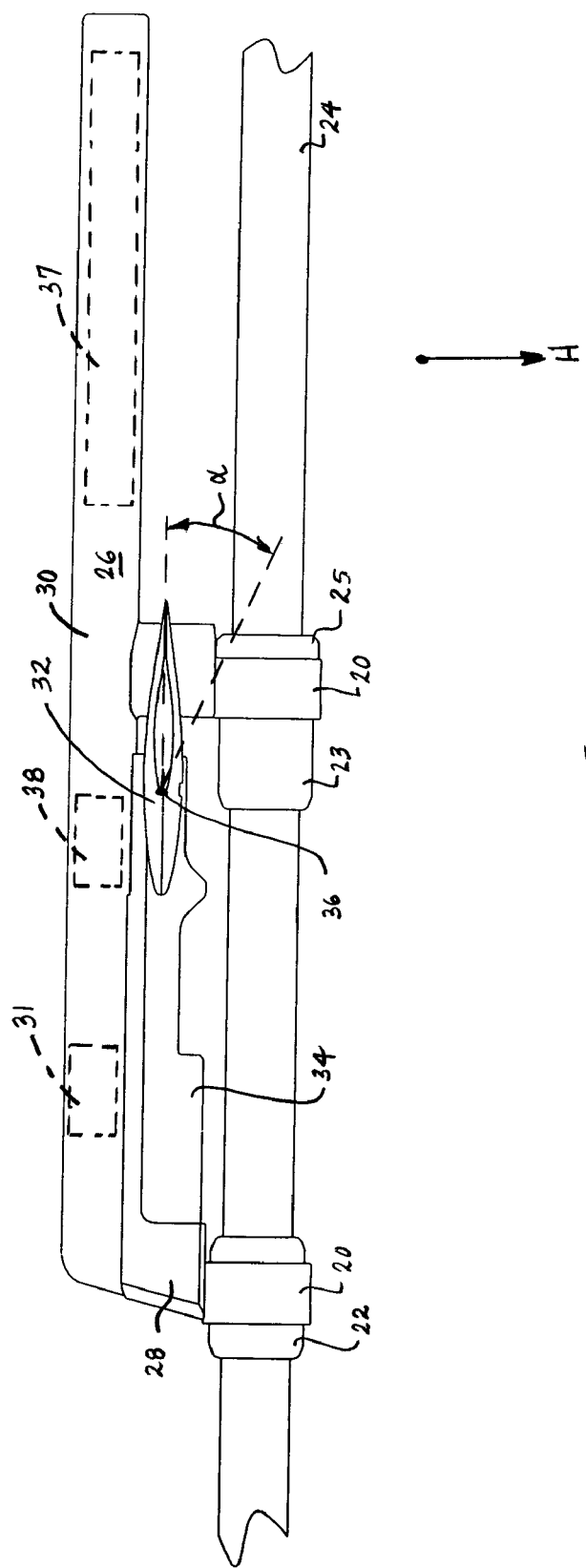
FIG. 2 is a top view of the cable-steering device of FIG. 1.
Figure 3:
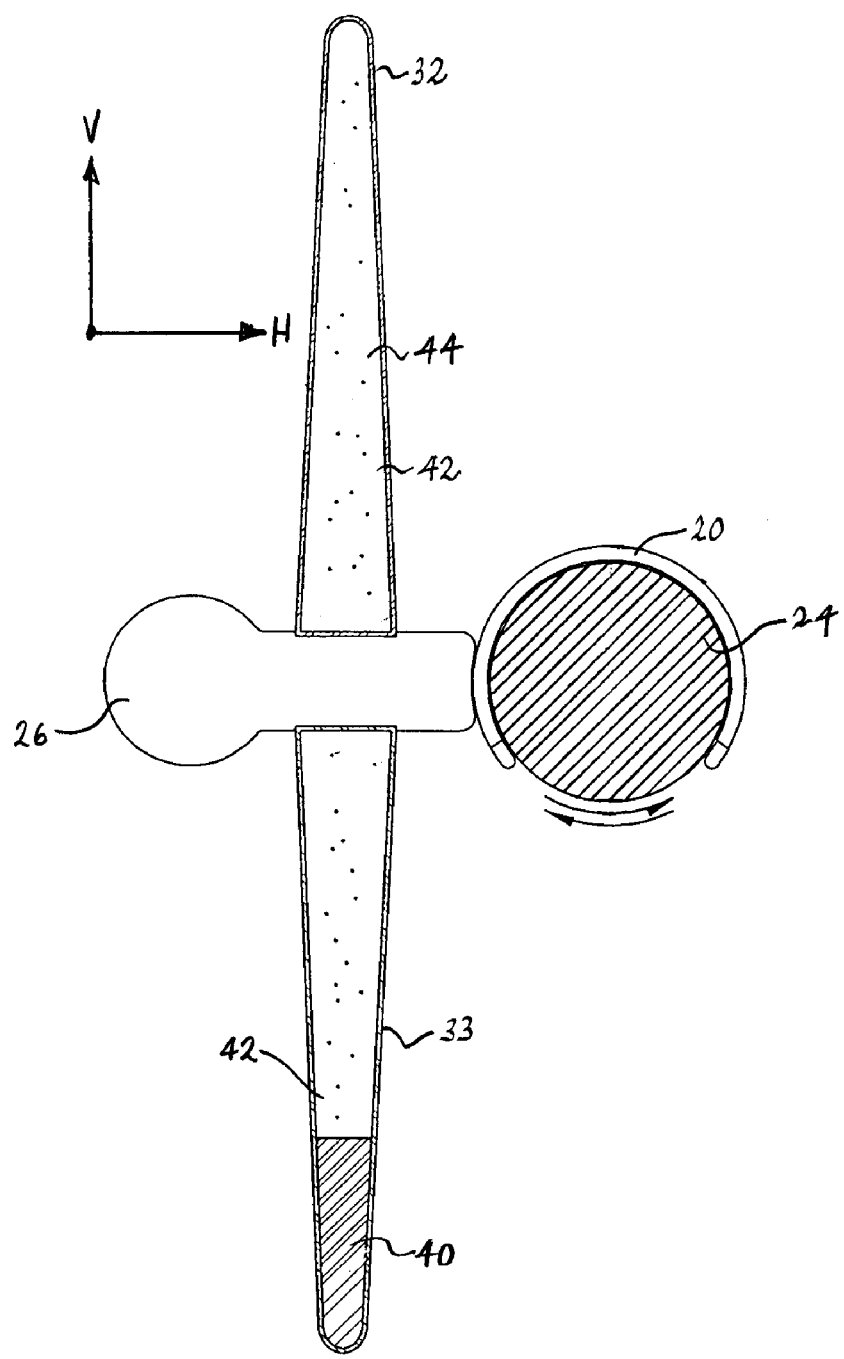
FIG. 3 is a cross section of the cable-steering device of FIG. 1 taken along lines 3—3.

A device, embodying features of the invention, for laterally steering a streamer cable is shown in FIGS. 1–3. The cable-steering assembly includes two connectors or cuffs 20 rotatably attached to collars 22, 23 affixed about the periphery of a streamer 24. Races are formed on the collars to receive the connectors and allow them to rotate freely about the streamer. An oversized stop 25 at the rear of the rear collar 23 keeps the cuffs in position as the cable is towed in the towing direction 27. Instead of rotating about collars encircling the streamer, the connectors could rotate about insert sections placed in-line between two streamer sections. The insert sections would themselves rotatably receive the connectors. The cuffs shown in FIGS. 1–3 could be realized as Quick Cuff™ connectors manufactured and sold by Input/Output, Inc. of Stafford, Tex., USA, and described in detail in U.S. Pat. No. 6,263,823, which is incorporated by reference. Alternatively, the connectors could be Quick Latch™ connectors, also manufactured and sold by Input/Output, Inc., and described in U.S. Pat. No. 5,507,243, incorporated by reference.

A streamer control device 26 has front and rear pylons 28, 29 that include latching hardware to releasably connect the control device to the connectors. The pylons extend from a main body 30, in the form of a hollow tube that houses electronic communication and control circuits 31, a battery 37, and a drive mechanism 38, including a motor. Wings 32, 33 extend from opposite sides of a wing support section 34 of the module body between the two pylons. Each wing is mounted on opposite ends 35', 35" of a single shaft or on the ends of separate shafts. A drive mechanism inside the body rotates the single shaft (or the separate shafts) to pivot each wing about pivot axes 36, 37 defined by the shafts, which are offset from the cable and do not intersect its long axis.

Thus far, the description of the cable-steering device essentially is the same as that for a cable-leveling bird, such as the DIGICOURSE® 5010 DIGIBIRD™ brand manufactured and sold by Input/Output, Inc. The purpose of the cable-leveling bird is to work in conjunction with other such birds attached along a streamer. To maintain the streamer at a desired depth, pivot axes of the wings remain generally in a horizontal plane. In this way, the bird pivots the wings in pitch about the pivot axis. As the pitch angle of the wings changes, lift is adjusted and, consequently, the depth of the cable can be controlled. The weight distribution and specific gravity of the cable-leveling bird/connector system is such that it remains suspended beneath the cable with the pivot axes of its wings generally in a horizontal plane.

The cable-steering bird of the invention, however, is ballasted so that the pivot axes of its wings remain largely vertical (V), as shown in FIGS. 1–3. In this way, changing the angle $\alpha$ (of the wings steers the cable horizontally (H). To maintain the pivot axes 36, 37 generally vertical, the cable-steering bird 26, the connectors 20, and anything attached to them to rotate about the cable with them is ballasted to keep specific gravity about the same as that of the cable itself. One way to achieve this is to make one of the wings 33 heavier than the other 32. This can be done, for example, by making the lower wing out of a denser material or installing a weight 40, such as a lead or tungsten weight, in a void 42 within the wing. (The wings of cable-leveling birds are typically solid and molded out of polyurethane.) The interior of one or both wings can be hollow with a void that is empty or filled with a foam material 44, such as glass-sphere-filled polyurethane or glass-sphere-filled epoxy, to keep them lightweight without affecting their designed shape. Properly ballasted in this way, the bird is capable of steering the cable to which it is attached. Even as the cable 24 rotates within the connector 20 under tow, as shown in FIG. 3, the pivot axes 36, 37 of the wings remain largely in a vertical plane. Even if the pivot axes of the wings are not perfectly vertical, as long as some component of the axes lies in a vertical plane, some amount of steering is possible. For example, if the cable-steering assembly is insufficiently balanced and the pivot axes are at an angle of 45° relative to both horizontal and vertical, the wings can still provide a horizontal component of force to steer the streamer.

Figure 4C:
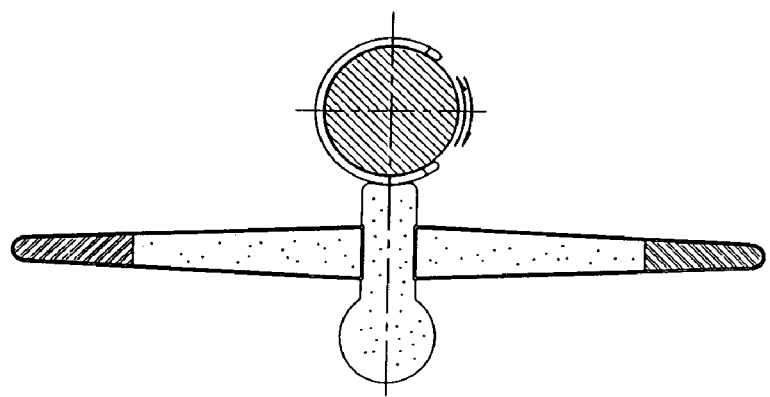
FIGS. 4A–4C are schematics representing various ways of ballasting a cable-steering device as in FIG. 1.
Figure 4B:
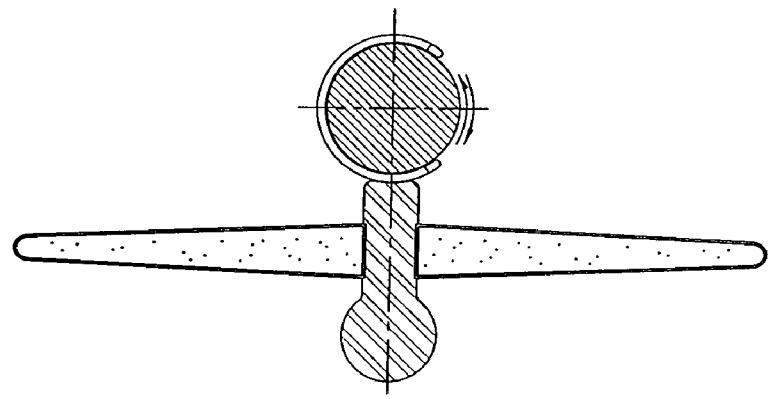
Figure 4A:
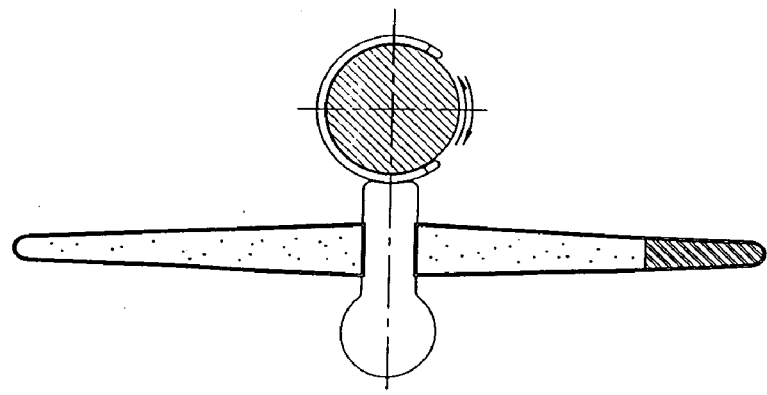

As illustrated in FIGS. 4A–4C, some ways to properly ballast the cable steering device include: a) making the upper wing light, the lower wing heavy, e.g., weighted at the lower end, and leaving the bird body as is (FIG. 4A); b) making the upper wing light, the lower wing light, and the bird body weighted enough to achieve neutral buoyancy (FIG. 4B); and c) making the upper wing heavy at the wing tip, the lower wing heavy at the wing tip, and the bird body light (FIG. 4C). Thus, the ballast may be apportioned among the wings and the bird body in a variety of ways to maintain the wings generally in a vertical plane.

Figure 6:
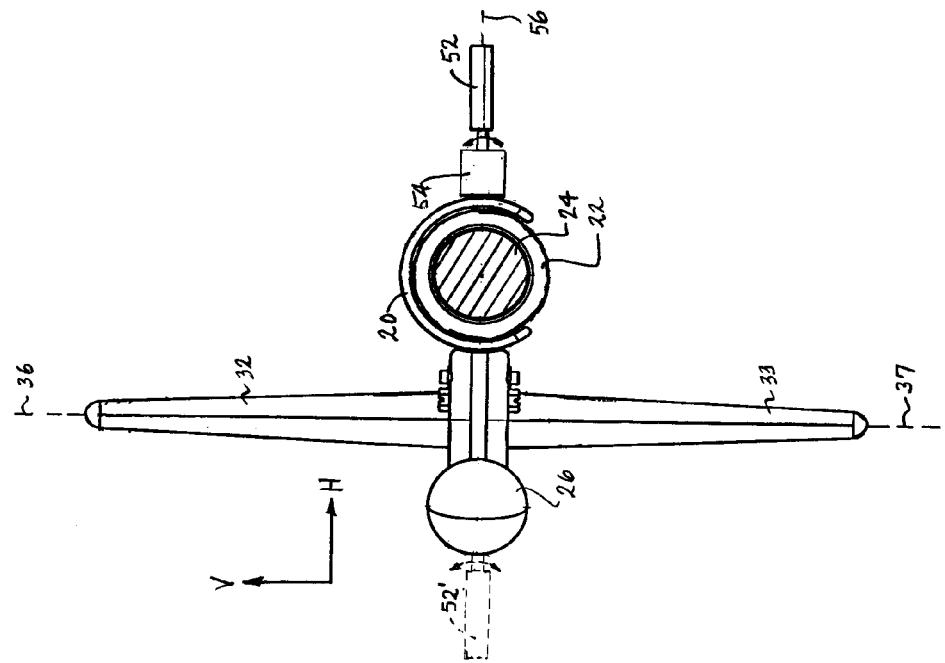
FIG. 6 is a front elevation view as in FIG. 4, but with an aileron control.
Figure 5:
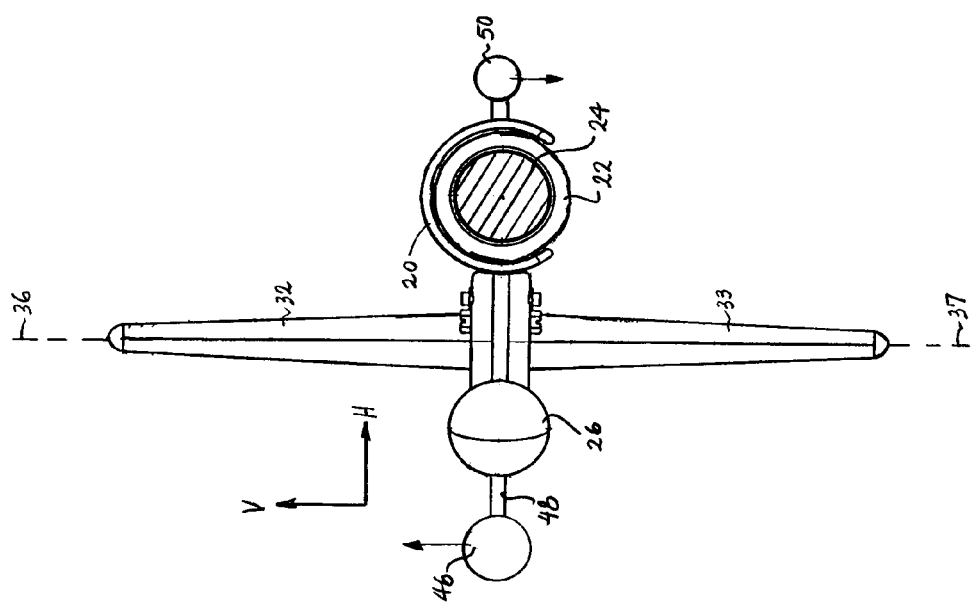
FIG. 5 is a front elevation view of a cable-steering device as in FIG. 1 with buoyant tank ballast.

Other ways of maintaining the pivot axes 36, 37 of the wings 32, 33 largely vertical are shown in FIGS. 5 and 6. In FIG. 5, a buoyant tank 46, or float, is attached to the bird body 26 as an appendage. The tank lowers the specific gravity of the bird assembly. Adjusting the volume of the tank or the length of its connecting arm 48 adjusts the specific gravity of the cable-steering assembly to maintain the pivot axes vertical. Adding flotation in this way can be used alone or in conjunction with adjusting the absolute and relative weights of the wings. Both these means for ballasting are effective in properly orienting the wings. Optionally, a weight 50, negatively buoyant, can be attached to the connector at a position on the opposite side of the cable to right the pivot axes of the bird assembly. These ballasting means may be used to preadjust the cable-steering assembly before deployment underwater. They are also hydrostatic in that they do not depend on the speed of the tow to be effective.

Another way to maintain the pivot axis of the wings vertical is shown in FIG. 6. In this version, a rudder or an aileron 52 is controlled by an aileron controller 54 attached to the connector 20 on the opposite side of the streamer from the cable-steering device 26. Alternatively, the aileron 52' could extend from the cable-steering device directly. The aileron rotates about a generally horizontal axis 56 similar to the wings of a cable-leveling bird and provides more or less lift to the cable-steering assembly as a function of its pitch angle of attack. But, in this version, the amount of lift depends on the speed of the streamer through the water. The aileron controller may include an orientation sensor to determine its orientation relative to vertical.

Figure 7:
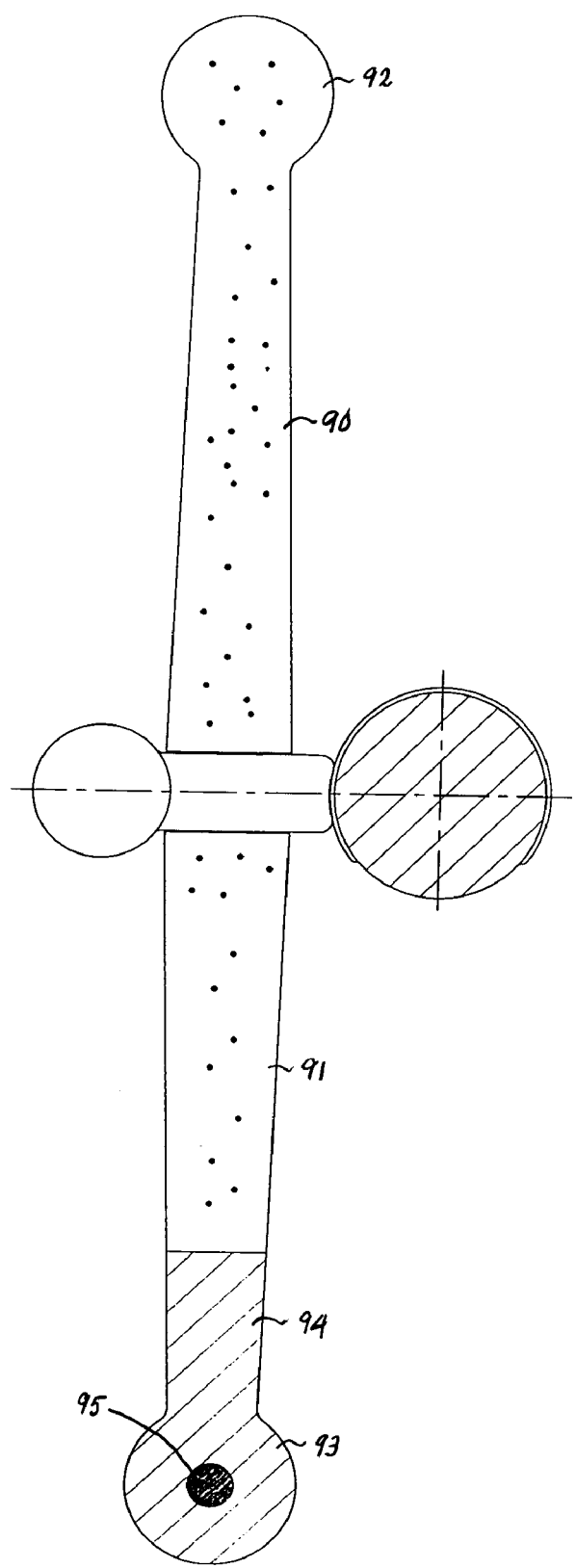
FIG. 7 is a front elevation view, partly in cross section, of another version of cable-steering device embodying features of the invention including wing tip tanks.

Another version of cable-steering device is shown in FIG. 7. In this version, the wings 90, 91 are tipped with bulbous portions, or tanks 92, 93, which provide more volume for ballast control. In the example, the upper wing includes a greater volume of low-density material than the upper wing of FIG. 1. The lower end of the lower wing may include a denser molded or fill material 94 or a weight 95 in the lower wing-tip tank.

Figure 8:
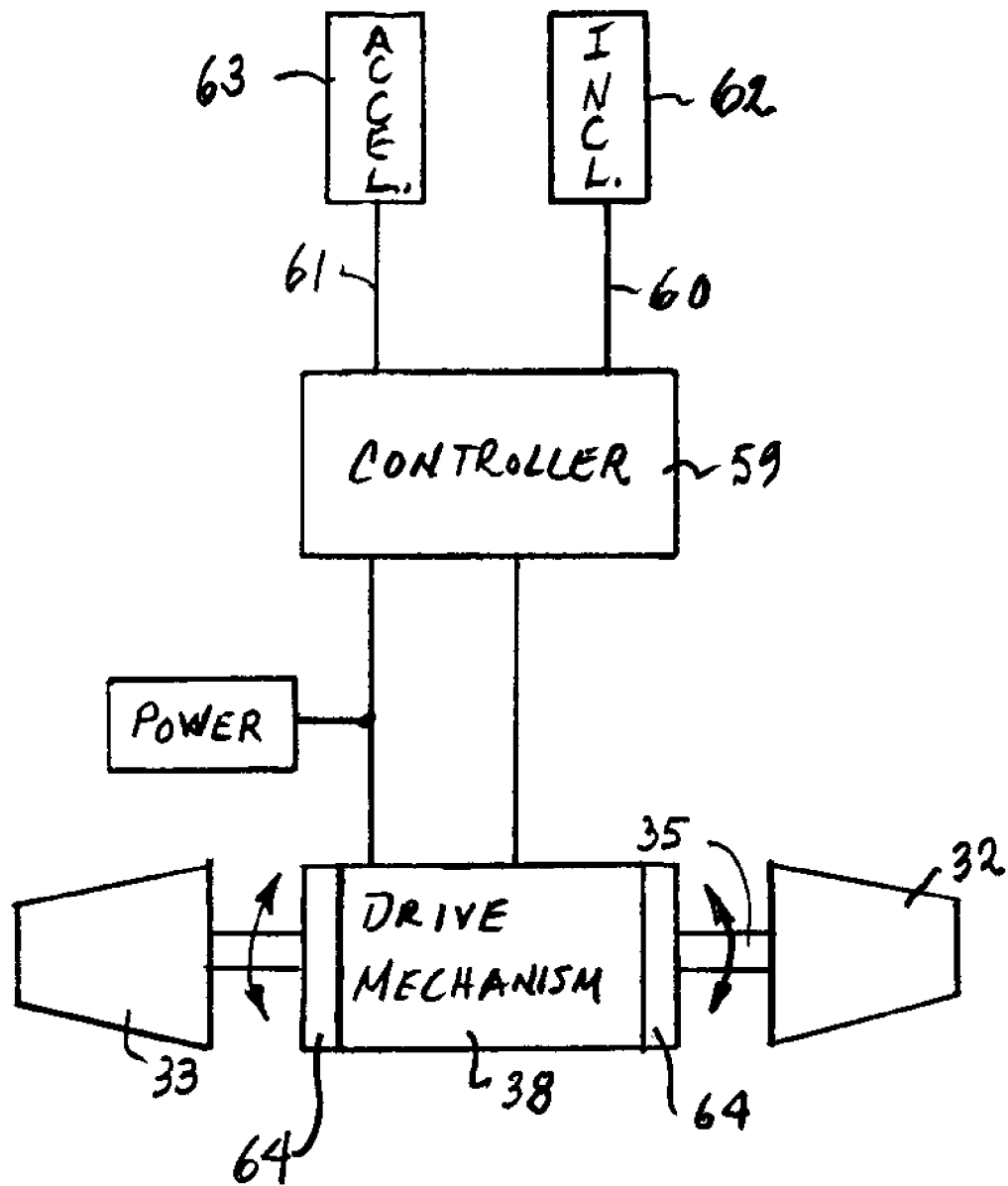
FIG. 8 is a schematic block diagram of the cable-steering devices of FIG. 1 and FIG. 7.

The wing control portion of the cable-steering bird is shown in FIG. 8. A controller 59, preferably including a microprocessor, receives signals 60, 61 representing the orientation of the bird body relative to vertical as defined by the gravity vector. Orientation sensors, such as an inclinometer 62 or an accelerometer 63, are used to determine the orientation. In some cases, an inclinometer alone may be sufficient. In other cases, in which cable accelerations are frequent and significant, multiple-axis accelerometers may be necessary. From the orientation sensor signals, the controller can determine the orientation of the wings. The cable is steered by adjusting the angle of attack of the wings 32, 33. A shipboard controller keeping track of all the streamers being towed determines what action each cable-steering device should take. The shipboard controller communicates that action to the controller in the cable-steering device, which adjusts the wings accordingly. A signal 64 representing a change in the wing angles and determined by the controller from its computation of the orientation of the device and from the steering command is sent to the wing drive mechanism 38, which includes one or more wing actuators 64. The wing actuators rotate the shaft or shafts 35, changing the angles of attack of the wings to change and, consequently, the lateral force on the streamer. The wings can be controlled independently by separate actuators and shafts or in unison by a single actuator and a single shaft.

Figure 9:
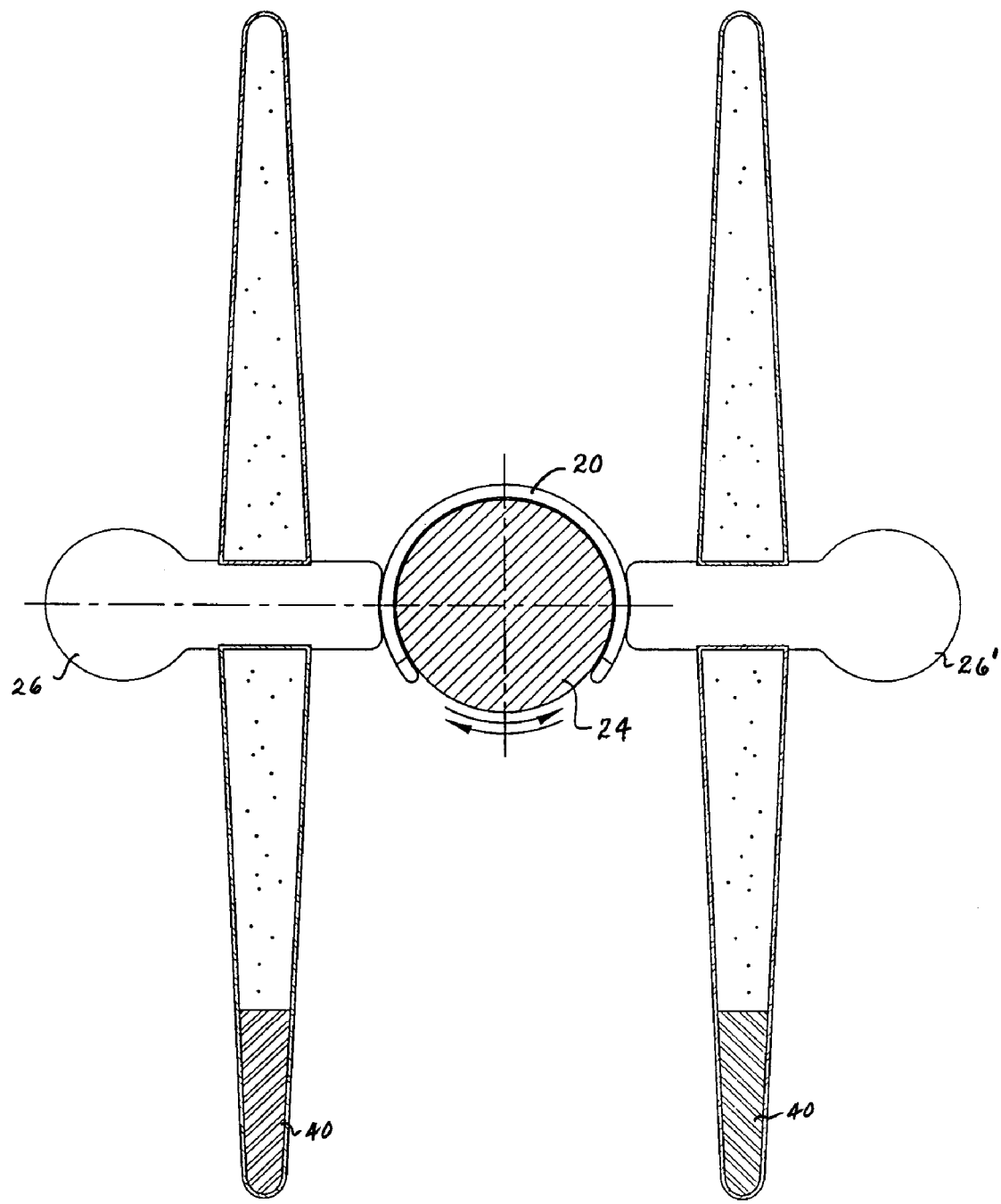
FIG. 9 is an isometric view of a dual cable-steering arrangement using two cable-steering devices as in FIG. 1.

As shown in FIG. 9, it is also possible to attach a pair of cable-steering devices 26, 26' to a streamer 24 with a connector 20. Each device is connected to the connector circumferentially spaced 180° to be positioned on opposite sides of the streamer. This arrangement would provide more wing surface area to exert greater lateral forces for steering the streamer. Each cable-steering device is ballasted, for example, by a weight in the lower wing, to maintain the wings in a generally vertical plane.

Figure 10:
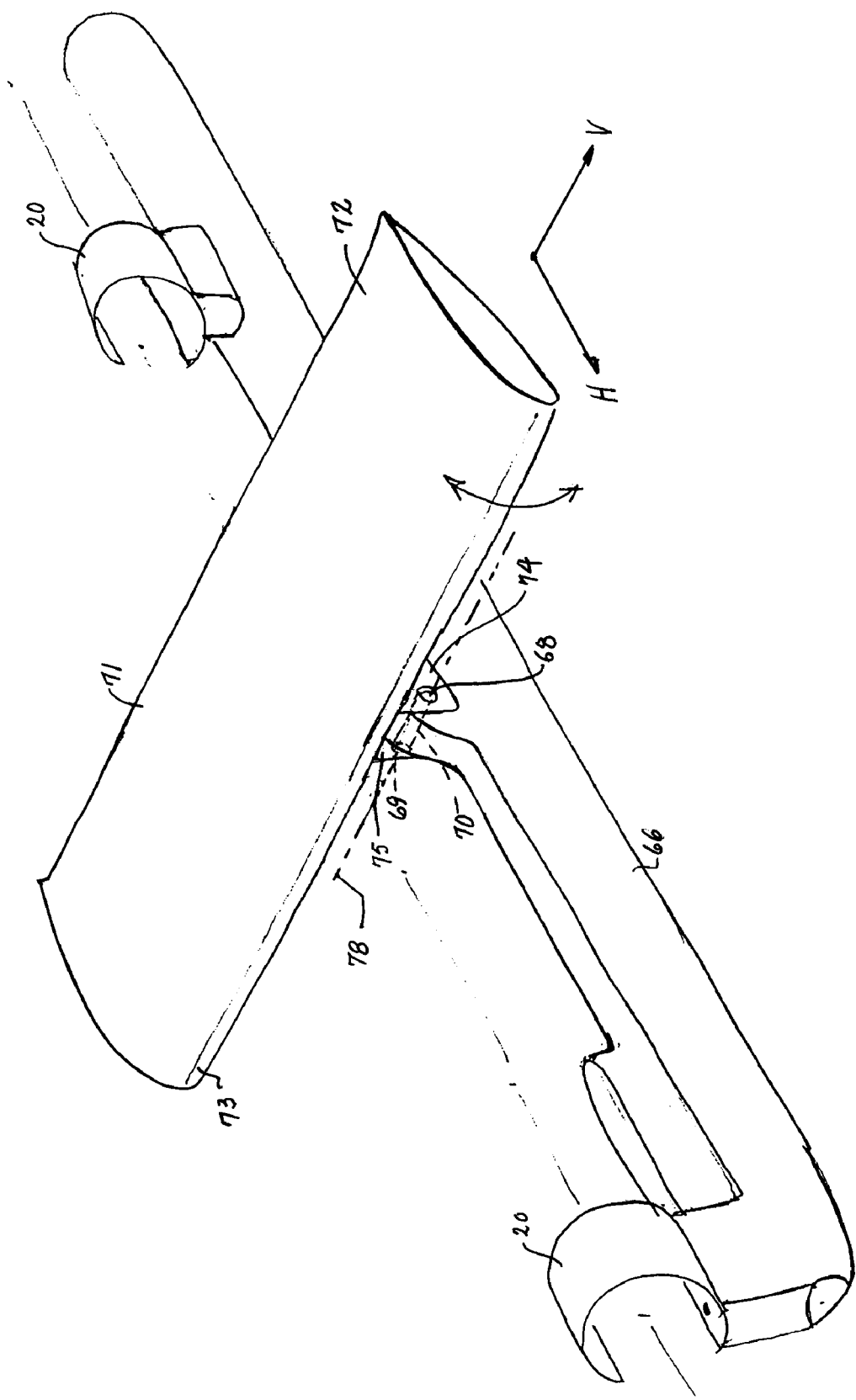
FIG. 10 is an isometric view of another version of cable-steering device embodying features of the invention including a single wing.

A single-wing version of cable-steering bird embodying features of the invention is shown in FIG. 10. While multi-wing versions make independent wing angle control for roll compensation possible, a single wing version provides dedicated lateral steering. This version is controllable by a controller as in FIG. 8. As in FIG. 1, a main body 66 attaches to a connector 20 that allows the body to be rotatable about a streamer cable. Like the body 30 in FIG. 1, the body 66 houses electronic communication and control circuits, a battery, and a drive mechanism, including a motor. Opposite ends 68, 69 of a shaft 70 extend from opposite sides of the body. A wing 71 includes a first wing portion 72 and an opposite second wing portion 73. The wing is formed of a polyurethane outer skin and an internal filler of glass-sphere-filled epoxy, for example, for lower density. Each wing portion is connected to an end of the shaft at attachment arms 74, 75. The shaft defines a pivot axis 78 about which the wing pivots. The two wing portions are preferably formed unitarily. The wing is ballasted so that the pivot axis lies largely in a vertical plane for laterally steering a streamer cable. The first wing portion, for example, can be ballasted with a material whose density is greater than that of water to urge it to ride below the streamer. The second wing portion, for example, can be ballasted with one or more voids that may be filled with a material less dense than water to urge it to ride above the streamer. With these and the other ballasting techniques already described, the single wing can be made to ride through the water with vertical stability.

Although the invention has been described with respect to a few preferred versions, other versions are possible. For example, the angles of each wing could be changed relative to each other to help maintain the wing pivot axes vertical. As another example, floats can be added to ballast the cable-steering assembly at various positions around the periphery of the connectors, to the body of the assembly at various positions, or internal to the body itself. So, as these few examples suggest, the scope of the invention is not meant to be limited to the preferred versions described in detail.

What is claimed is:

1. An underwater cable steering device comprising:
   a connector attachable around the periphery of an underwater cable and rotatable about the cable;
   a control device including:
      a body connected to the connector external of the cable;
      a first wing disposed at one side of the body and arranged to pivot about a first axis;
      a second wing disposed at an opposite second side of the body and ranged to pivot about a second axis;
      wherein the first axis and the second axis do not intersect the cable;
      means for pivoting the first wing about the first axis and the second wing about the second axis, wherein the means for pivoting comprises:
         a first shaft extending from the first side of the body and affixed to the first wing and defining the first axis;
         a second shaft extending from the second side of the body and affixed to the second wing and defining the second axis; and
         a drive mechanism connected to the first shaft and the second shaft to rotate the first shaft along the first axis and the second shaft along the second axis, thereby to adjust the angle of attack of the wings;
   ballast means to help ballast the control device to maintain the first axis and the second axis largely vertically disposed.

2. A device as in claim 1 wherein the ballast means includes a weighted portion in the first wing.

3. A device as in claim 1 wherein the ballast means includes a foamed portion in the second wing less dense than the rest of the second wing.

4. A device as in claim 1 wherein the first and second wings each include hollowed portions.

5. A device as in claim 1 wherein the first and second wings each include tanks at the wing tips.

6. A device as in claim 1 wherein the first shaft and the second shaft are axially aligned.

7. A device as in claim 1 wherein the first shaft and the second shaft are opposite ends of the same shaft.

8. A device as in claim 1 wherein the drive mechanism includes a first actuator coupled to the first wing and a second actuator coupled to the second wing.

9. A device as in claim 1 wherein the drive mechanism includes an actuator coupled to both wings.

10. A device as in claim 1 wherein the control device includes an orientation sensor producing a signal representing the orientation of the body.

11. A device as in claim 1 wherein the control device includes an accelerometer producing a signal representing the acceleration of the body through the water.

12. A device as in claim 1 wherein the fast wing is heavier than the second wing.

13. A device as in claim 1 wherein the ballast means comprises a negatively buoyant body attached to the connector at a circumferentially offset position from the control device around the periphery of the connector.

14. A device as in claim 1 wherein the ballast means includes a positively buoyant appendage extending from the body.

15. A device as in claim 1 wherein the ballast means includes a weight in the first wing.

16. A device as in claim 1 wherein the ballast means includes a float attached to the connector.

17. A device as in claim 1 further comprising a second control device connected to the connector on the opposite side of the underwater cable from the other control device.

18. An underwater cable steering device comprising:
   a connector attachable around the periphery of an underwater cable and rotatable about the cable;
   a control device including:
      a body connected to the connector external of the cable;
      a shaft extending through the body and defining a pivot axis;
      a first wing portion connected to one end of the shaft at one side of the body to pivot about the pivot axis;
      a second wing portion connected to the opposite end of the shaft at an opposite side of the body to pivot about the pivot axis;
      a drive mechanism connected to the shaft to rotate the shaft about the pivot axis to adjust the angle of attack of the wing portions;
      wherein the pivot axis does not intersect the cable;
   ballast means to help ballast the control device to maintain the pivot axis largely vertically disposed.

19. A device as in claim 18 further comprising a second control device connected to the connector ante opposite side of the underwater cable from the other control device.

20. A device as in claim 18 wherein the ballast means includes a weighted portion in the first wing portion.

21. A device as in claim 18 wherein the ballast means includes a foamed portion in the second wing portion less dense than the rest of the second wing portion.

22. A device as in claim 18 wherein the first and second wing portions each include hollowed portions.

23. A device as in claim 18 wherein the drive mechanism includes an actuator coupled to both wing portions.

24. A device as in claim 18 wherein the control device includes an orientation sensor producing a signal representing the orientation of the body.

25. A device as in claim 18 wherein the control device includes an accelerometer producing a signal representing the acceleration of the body through the water.

26. A device as in claim 18 wherein the first wing portion is heavier than the second wing portion.

27. A device as in claim 18 wherein the ballast means comprises a negatively buoyant body attached to the connector at a circumferentially offset position from the control device around the periphery of the connector.

28. A device as in claim 18 wherein the ballast means includes a positively buoyant appendage extending from the body.

29. A device as in claim 18 wherein the ballast means includes a weight in the first wing portion.

30. A device as in claim 18 wherein the ballast means includes a float attached to the connector.

31. A device as in claim 18 wherein the first wing portion and the second wing portion are unitarily formed.

32. An underwater cable steering device comprising:
   a connector attachable around the periphery of an underwater cable and rotatable about the cable;
   a control device including:
      a body connected to the connector external of the cable;
      a first shaft extending from a first side of the body;
      a first wing attached to an end of the first shaft and arranged to pivot about a first axis defined by the axial rotation of the first shaft;
      a drive mechanism coupled to the first shaft to rotate the first shaft on the first axis to adjust the angle of attack of the first wing;
      wherein the first axis does not intersect the cable;
   ballast means to help ballast the control device to maintain the first axis largely vertically disposed.

33. A device as in claim 32 further comprising a second control device connected to the connector on the opposite side of the underwater cable from the other control device.

34. A device as in claim 32 wherein the ballast means includes a weighted portion in the first wing.

35. A device as in claim 32 wherein the ballast means includes a foamed portion in the first wing less dense than the rest of the first wing.

36. A device as in claim 32 wherein the ballast means includes a hollowed portion in the first wing.

37. A device as in claim 32 wherein the first wing includes a tank at the wing tip.

38. A device as in claim 32 wherein the control device further includes:
   a second wing attached to an end of the first shaft opposite the first wing and arranged to pivot about the first axis defined by the axial rotation of the first shaft.

39. A device as in claim 38 wherein the first wing and the second wing are unitarily formed as a single wing structure.

40. A device as in claim 32 wherein the control device further includes:
   a second shaft extending out of the second side of the body opposite the first shaft and defining a second axis not intersecting the cable;
   a second wing affixed to the second shaft;
   wherein the drive mechanism is coupled to the second shaft to rotate the second shaft along the second axis, thereby to adjust the angle of attack of the second wings.

41. A device as in claim 40 wherein the first shaft and the second shaft are axially aligned.

42. A device as in claim 40 wherein the first shaft and the second shaft are opposite ends of the same shaft.

43. A device as in claim 40 wherein the drive mechanism includes a first actuator coupled to the first wing and a second actuator coupled to the second wing.

44. A device as in claim 40 wherein the drive mechanism includes an actuator coupled to both wings.

45. A device as in claim 32 wherein the control device includes an orientation sensor producing a signal representing the orientation of the body.

46. A device as in claim 32 wherein the control device includes an accelerometer producing a signal representing the acceleration of the body through the water.

47. A device as in claim 40 wherein the first wing is heavier than the second wing.

48. A device as in claim 32 wherein the ballast means comprises a negatively buoyant body attached to the connector at a circumferentially offset position from the control device around the periphery of the connector.

49. A device as in claim 32 wherein the ballast means includes a positively buoyant appendage extending from the body.

50. A device as in claim 32 wherein the ballast means includes a float attached to the connector.

* * * * *